United States Patent
Izumikawa et al.

(10) Patent No.: US 7,486,928 B2
(45) Date of Patent: Feb. 3, 2009

(54) METHODS AND APPARATUS FOR WIRELESS COMMUNICATIONS

(75) Inventors: Haruki Izumikawa, Fujimino (JP); Kenji Saito, Fujimino (JP); Keizo Sugiyama, Fujimino (JP)

(73) Assignee: KDDI Corporation, Tokyo (JP)

( * ) Notice: Subject to any disclaimer, the term of this patent is extended or adjusted under 35 U.S.C. 154(b) by 528 days.

(21) Appl. No.: 11/401,885

(22) Filed: Apr. 12, 2006

(65) Prior Publication Data
US 2006/0264172 A1 Nov. 23, 2006

(30) Foreign Application Priority Data
Apr. 14, 2005 (JP) ............................. 2005-116828
Apr. 19, 2005 (JP) ............................. 2005-121284

(51) Int. Cl.
*H04B 7/15* (2006.01)

(52) U.S. Cl. ..................... 455/11.1; 455/7; 455/13.1; 455/560; 455/41.2

(58) Field of Classification Search ................ 455/11.1, 455/560, 13.1, 16, 24, 41.2, 500, 552.1, 66.1, 455/67.11, 7
See application file for complete search history.

(56) References Cited

U.S. PATENT DOCUMENTS 7,366,135 B2 * 4/2008 Konishi et al. .............. 370/329
2004/0102219 A1 * 5/2004 Bunton et al. ............... 455/560
2004/0171400 A1 * 9/2004 Rosen et al. ................ 455/518

FOREIGN PATENT DOCUMENTS

JP 11-112412 A 4/1999
JP 2004-007440 A 1/2004

OTHER PUBLICATIONS

Japanese Office Action dated Dec. 19, 2007, issued in corresponding Japanese Patent Application No. 2005-121284.
IEEE Standard for Local and metropolitan area networks, "Part 16: Air Interface for Fixed Broadband Wireless Access Systems", IEEE Std 802.16-2004, Oct. 1, 2004, NY.
IEEE Standard for Local and metropolitan area networks, "Part 16: Air Interface for Fixed and Mobile Broadband Wireless Access Systems, Amendment 2: Physical and Medium Access Control Layers for Combined Fixed and Mobile Operation in Licensed Bands and Corrigendum I", IEEE Std 802.16e-2005, Feb. 28, 2006, NY.

* cited by examiner

*Primary Examiner*—Tan Trinh
(74) *Attorney, Agent, or Firm*—Westerman, Hattori, Daniels & Adrian, LLP.

(57) ABSTRACT

The present invention provides a system for wireless data communications that allows, in P-MP wireless data communications, equally giving communications opportunities to mobile stations that directly communicate with a wireless base station and mobile stations that indirectly communicate therewith via a relay station and a communications method thereof. In comparison with the OFDM frame configuration prescribed in IEEE802.16, an OFDM frame configuration is characterized in that, in an uplink subframe, a ranging period and BW (bandwidth) request periods for a relay station are provided, and furthermore, a remaining message number notice period for which each relay station notifies the wireless base station of the number of remaining messages is provided. These periods are not of a contention base but bandwidths dedicated to the relay station.

16 Claims, 12 Drawing Sheets

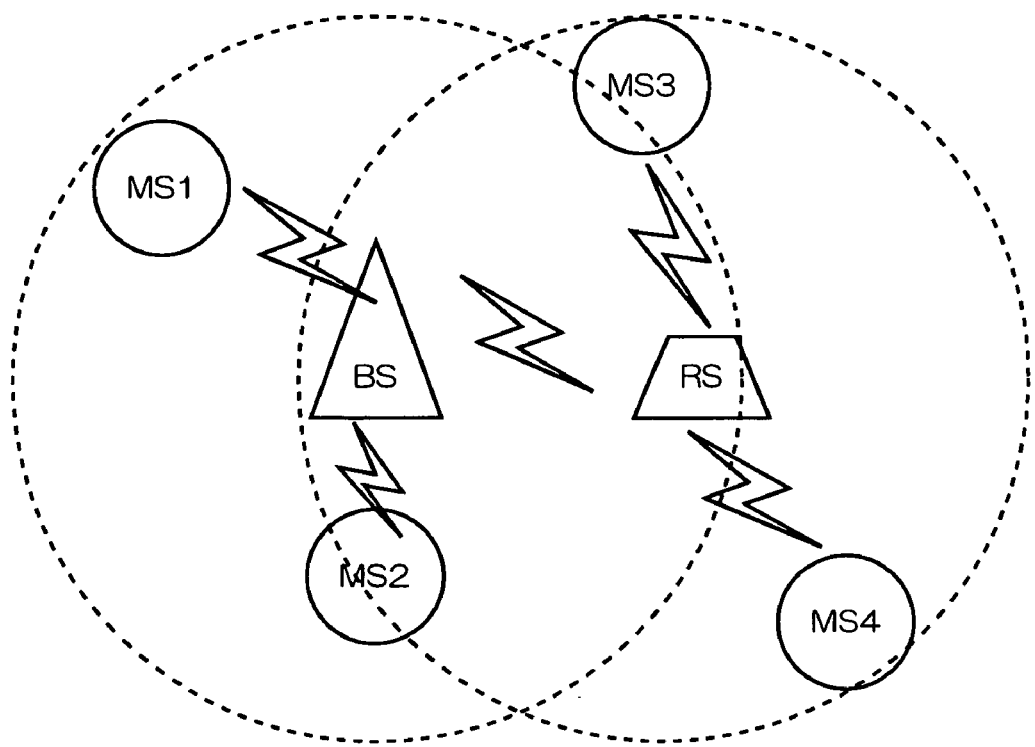

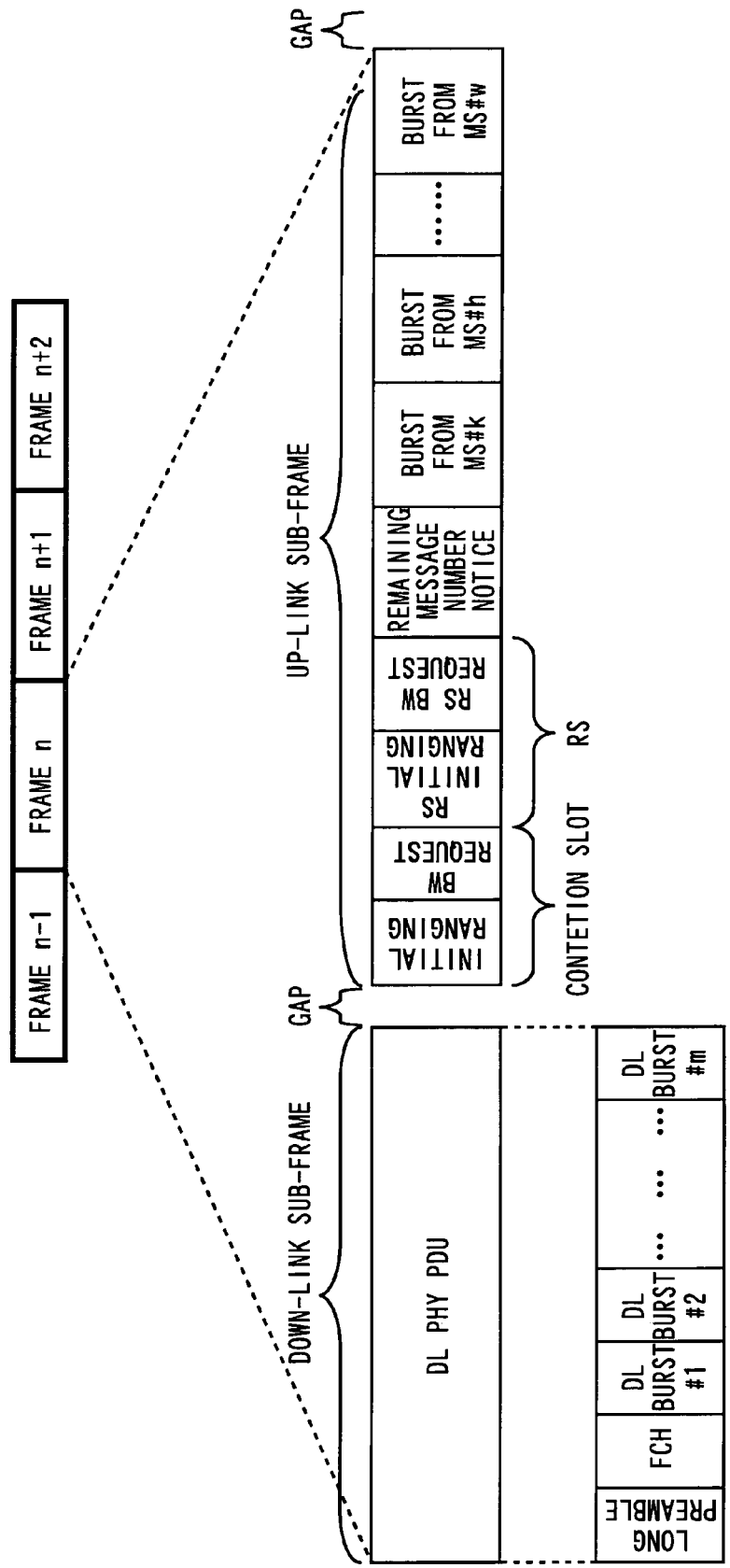

| CID_ran_RS1 | t1 | 10000 | 111 | 11110 | 01 |
| --- | --- | --- | --- | --- | --- |
| CID_ran_RS2 | t2 | 10000 | 111 | 11001 | 01 |
| CID_bw_RS1 | t3 | 10000 | 111 | 10101 | 01 |
| CID_bw_RS2 | t4 | 10000 | 111 | 01111 | 01 |

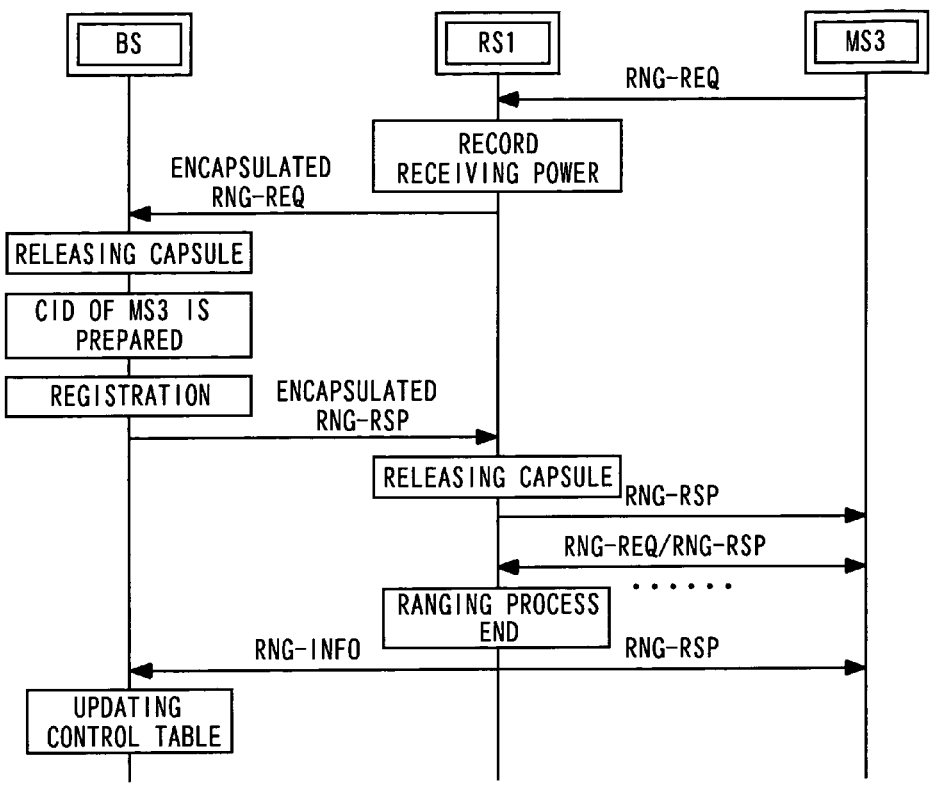
Fig. 7
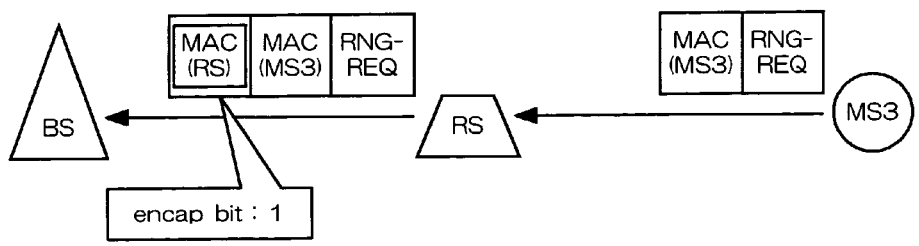
Fig. 8
Fig. 9
| MAC Address | Basic CID | Primary Management CID | @ |
|---|---|---|---|
| Mac-addr_MS3 | Basic-cid_MS3 | Pm-cid_MS3 | RS |

| Management Message Type = 8 (8) | TLV Type = 1 (8) | TLV Type = 1 (8) | RS-MS Downlink Operational Burst Profile (16) |
|---|---|---|---|
| RS-MS Downlink Operational Burst Profile | TLV Type = 2 (8) | RS-MS Uplink Burst Profile (8) | TLV Type = 3 (8) |
| Basic CID (16) | | | |

Fig. 12

| MAC Address | Basic CID | Primary Management CID | @ | Burst Profile (BS-) | Burst Profile (RS-MS) |
|---|---|---|---|---|---|
| Mac-addr_MS3 | Basic-cid_MS3 | Pm-cid_MS3 | RS | Z | X |

Fig. 13

| MAC Address | Basic CID | Primary Management CID | @ | Burst Profile (BS-) | Burst Profile (RS-MS) |
|---|---|---|---|---|---|
| Mac-addr_MS1 | Basic-cid_MS1 | Pm-cid_MS1 | BS | X | – |
| Mac-addr_MS2 | Basic-cid_MS2 | Pm-cid_MS2 | BS | Y | – |
| Mac-addr_MS3 | Basic-cid_MS3 | Pm-cid_MS3 | RS | Z | X |
| Mac-addr_MS4 | Basic-cid_MS4 | Pm-cid_MS4 | RS | Z | X |

Fig. 17

| HT | EC | Type (6) | RSVD | CI | EKS (2) | RSDV | LEN MSB (3) |
|---|---|---|---|---|---|---|---|
| LEN LSB (8) | | | CID MSB (8) | | | | |
| CID LSB (8) | | | HCS (8) | | | | |

PRIOR ART

METHODS AND APPARATUS FOR WIRELESS COMMUNICATIONS

BACKGROUND OF THE INVENTION

1. Field of the Invention

The present invention relates to a method and system for wireless communications suitable for P-MP wireless communications.

2. Description of the Related Art

High-speed wireless data communications standards (IEEE802.16) have been specified in Non-Patent Document 1. In the physical layer of IEEE802.16, Single Carrier, OFDM (Orthogonal Frequency Division Multiplexing), and OFDMA (Orthogonal Frequency Division Multiplexing Access) have been supported as modulation systems. Hereinafter, description will be given of a wireless data communications method compliant with IEEE802.16 with reference to a case where OFDM is adopted as the modulation system, for example.

In IEEE802.16, P-MP (point-to-multipoint) architecture has been prescribed as one of the communication modes, and in the P-MP, a base station (BS) schedules transmission/reception opportunities of all mobile stations (MSs), whereby making it possible to carry out efficient communications to which QoS (Quality of Service) has been ensured.

FIG. 16 shows an example of an OFDM frame configuration in P-MP, in which scheduling information is stored in a MAP message included in a broadcast message field within a first DL (downlink) burst following a preamble and an FCH (Frame Control Header).

In the scheduling information, downlink slot information and uplink slot information to be assigned to each MS are stored. As a result of receiving these types of information, the MS can find out the time at which data addressed to itself arrives and the time at which it may transmit data. Hereinafter, the MAP message included in the broadcast message field within the first DL burst (#1) following the FCH is expressed as a MAP message.

Each BS is provided with a 48-bit Base Station ID (BSID), and the MS identifies each BS based on the BSID. High-order 24 bits of the BSID are unique to each service provider, and within the identical service provider, each BS is identified based on low-order 24 bits.

FIG. 17 shows a frame structure of a MAC header prescribed in IEEE802.16, and in each of the connections, a unique connection ID is provided for each connection. In the MAC header according to IEEE802.16, a space for the connection ID is prepared, and the BS and MS identify a packet based on the connection ID.

Each MS periodically carries out a ranging process when joining and after joining a network so as to adjust transmission/reception timing with the BS and transmission power. When joining a network, each MS carries out ranging in an initial ranging period assigned by the BS. This initial ranging period is of a contention base, and the MS transmits a RNG-REQ (ranging request) message to the BS in this period. The BS that has received the RNG-REQ registers information such as transmission power, frequency, and transmission timing in a RNG-RSP (ranging response) message with a ranging continue notice (Ranging Status in RNG-RSP=continue) so as to respond to the MS if adjustment of the MS is necessary.

The MS that has received the RNG-RSP with the ranging continue notice adjusts transmission power, frequency, and transmission timing and then transmits RNG-REQ again to the BS in an initial ranging period assigned to each MS by the BS. If the transmission power and the like of the MS satisfies a preset value, the BS responds to the MS with RNG-RSP with a ranging success notice (Ranging Status in RNG-RSP=success).

Such ranging ends with the RNG-RSP with the ranging success notice being received by the MS. Ranging that is carried out after the MS has joined a network is carried out in an initial ranging period the same as that when it joins a network or in an initial ranging period assigned for the MS.

In a case of OFDMA, the above-described ranging steps uniquely identify an MS by a CDMA base using a code prescribed in Non-Patent Document 2 prescribed within a pre-assigned "ranging subchannel" range (FIG. 18).

The BS transmits data to an SS by use of a burst profile described in "Downlink Operational Burst Profile" of the RNG-RSP. In addition, the MS transmits data to the BS by use of a burst profile described in UIUC of a UL-MAP. The burst profile described in UIUC of the UL-MAP is specified by the BS. The burst profile means a parameter set including a modulation system, an FEC code type, and the like.

[Non-Patent Document 1] IEEE Standard for Local and metropolitan area networks—Part 16: Air Interface for Fixed Broadband Wireless Access Systems, IEEE Std 802.16-2004, Oct., 2004.

[Non-Patent Document 2] IEEE Standard for Local and metropolitan area networks—Part 16: Air Interface for Fixed and Mobile Broadband Wireless Access Systems, Amendment 2: Physical and Medium Access Control Layers for Combined Fixed and Mobile Operation in Licensed Bands and Corrigenduml, IEEE Std802.16e-2005, February 2006.

In wireless data communications, owing to an influence of radio attenuation caused by shielding by an obstacle located between transmission and reception antennas, there is a blind zone where an MS cannot communicate with a BS despite being in a service area. For high-speed wireless data communications, it is necessary to use a high frequency, however, with a high frequency, the wavelength is short and rectilinear propagation characteristics of radio waves increase, therefore, a further increase in the blind zone is expected. As a method for eliminating such a blind zone, it can be considered to install a relay station (RS) between the BS and MS.

However, when the RS is added to a P-MP wireless data communications system, inequality occurs when MSs that directly communicate with the BS are compared with MSs that indirectly communicate with the BS via an RS in terms of communications opportunities of a ranging request and communications opportunities of a bandwidth request. Namely, for the MS that indirectly communicates with the BS, since it becomes necessary to have a communications opportunity at which the MS itself makes a request to the RS and a communications opportunity at which the RS makes a request further to the BS, the MS is disadvantageous in comparison with the MS that directly communicates with the BS.

Furthermore, if a relay station is added to the P-MP, it is necessary for the BS to hold information on SSs under the base station and to provide connection IDs for the SSs. Here, if a passive relay that simply transmits received data after shaping and power amplification is used as the relay station, since the BS cannot know the transmission/reception environment between the RS and SS, a suitable modulation system cannot be selected.

SUMMARY OF THE INVENTION

It is a first object of the present invention to provide a system for wireless communications that allows, in P-MP wireless data communications, equally giving communications opportunities to MSs that directly communicate with a BS and MSs that indirectly communicate with the BS via an RS and a communications method thereof.

It is a second object of the present invention to provide a system for wireless communications that enables, in P-MP wireless data communications, high-speed wireless communications via a relay station and a communications method thereof.

In order to achieve the first object described above, according to the present invention, a method for P-MP wireless data communications for which a plurality of MSs are connected to one wireless BS includes an RS that relays communications between the BS and each MS, and further includes the following steps.

(1) The RS includes the steps of: receiving a communications opportunity request message from the MS; and forwarding the request message to the BS, and the BS-includes the steps of: receiving a request message from the MS, receiving a request message from the RS, and returning a response message that notifies the requester of a communications opportunity assigned thereto in response to the request message, and request message transmission periods are different between the MS and RS.

(2) The transmission period of a request message assigned to the MS is of a contention base, and the transmission period of a request message assigned to the RS is not of a contention base.

(3) The communications opportunity assigned to the RS is dynamically set based on the data amount transmitted and received by the RS and BS.

Furthermore, in order to achieve the second object described above, according to the present invention, a method for P-MP wireless data communications for which a plurality of mobile stations are connected to one wireless base station includes a relay station that relays communications between the wireless base station and each mobile station, and further includes the following steps.

(4) The relay station includes the steps of: receiving a packet addressed to the wireless base station from the mobile station; encapsulating the packet with a header whose source is the relay station; and transmitting the encapsulated packet to the wireless base station, the wireless base station includes the steps of: receiving the encapsulated packet; decapsulating the received packet; generating a response packet to the received packet; encapsulating the response packet with a header whose destination is the relay station; and transmitting-the encapsulated response packet, and the relay station further includes the steps of: receiving the encapsulated response packet from the wireless base station; decapsulating the response packet; and transmitting the response packet to the mobile station.

(5) The relay station further includes the step of notifying the wireless base station of burst profiles adopted between the relay station itself and mobile station.

(6) The mobile station includes the steps of: judging which of the wireless base station or relay station a transmitted packet is received by; and setting a retransmission timer of the packet longer when the packet is received by the relay station than when received by the wireless base station.

According to the present invention, since the above-described features are provided, the following effects are achieved.

(1) In the P-MP wireless data communications, since different transmission periods are assigned to the MS which can directly communicate with the BS and RS which can not directly communicate with the BS so that both do not contend with each other, request message transmission opportunities are equally given to each MS.

(2) The transmission period of a request message assigned to the MS by the BS is of a contention base, while the transmission period of a request message assigned to the RS by the BS is not of a contention base, therefore, the MS under the RS can reliably communicate with the BS as long as it can communicate with the RS.

(3) Since the communications opportunity assigned to the RS is dynamically set based on the data amount transmitted and received by the RS and BS, communications opportunities are equally given to MSs under the RS with a large number of mobile stations and MSs under the RS with a small number of mobile stations.

(4) In the P-MP wireless data communications, even in an environment where the wireless base station and mobile terminals cannot directly communicate with each other, these communicate with each other by way of the relay station.

(5) Since the relay station notifies the wireless base station of the burst profiles adopted between the same and mobile station, the wireless mobile station can employ a modulating system suitable for a communications environment between the relay station and mobile station, and as a result, it becomes possible to make efficient use of frequency.

(6) Since the mobile station sets the length a retransmission timer according to the communication destination, an unnecessary retransmission can be prevented even when it is connected with the wireless base station by way of the relay station.

BRIEF DESCRIPTION OF THE DRAWINGS

FIG. 1 shows a configuration of a network to which a P-MP wireless communications method according to the present invention is applied;

FIG. 2 shows a frame structure of a MAC header provided for a transmitting/receiving packet in the present invention;

FIG. 3 shows an OFDM frame configuration in the present invention;

FIG. 7 is a time chart showing operations of the present invention;

FIG. 8 schematically shows a condition where a RNG-REQ message transmitted from an MS is encapsulated by an RS and is forwarded to a BS;

FIG. 9 shows an example of a control table prepared for controlling each MS in a BS;

FIG. 12 shows an example of a BS control table;

FIG. 13 shows an example of a BS control table;

FIG. 17 shows a frame structure of a MAC header prescribed in IEEE802.16; and

DETAILED DESCRIPTION OF THE PREFERRED EMBODIMENT

FIG. 1 shows a configuration of a network to which a P-MP wireless communications method according to the present invention is applied. Since an MS1 and an MS2 are located within a wireless area of a BS, these can directly communicate with the BS. In contrast thereto, since an MS3 and an MS4 are located outside the wireless area, these communicate with the BS via an RS located within the wireless area of the BS.

FIG. 2 shows a frame structure of a MAC header of a packet transmitted and received in the present embodiment, which is compliant with the frame structure of the MAC header (FIG. 17) defined in IEEE802.16. In the present embodiment, one of the reservation bits of the MAC header is used for encapsulation (encap bit), and when this bit is "1," MAC encapsulation is considered to be carried out. When the bit is "0," the same as the MAC header according to IEEE802.16 applies.

Figures 4, 5:
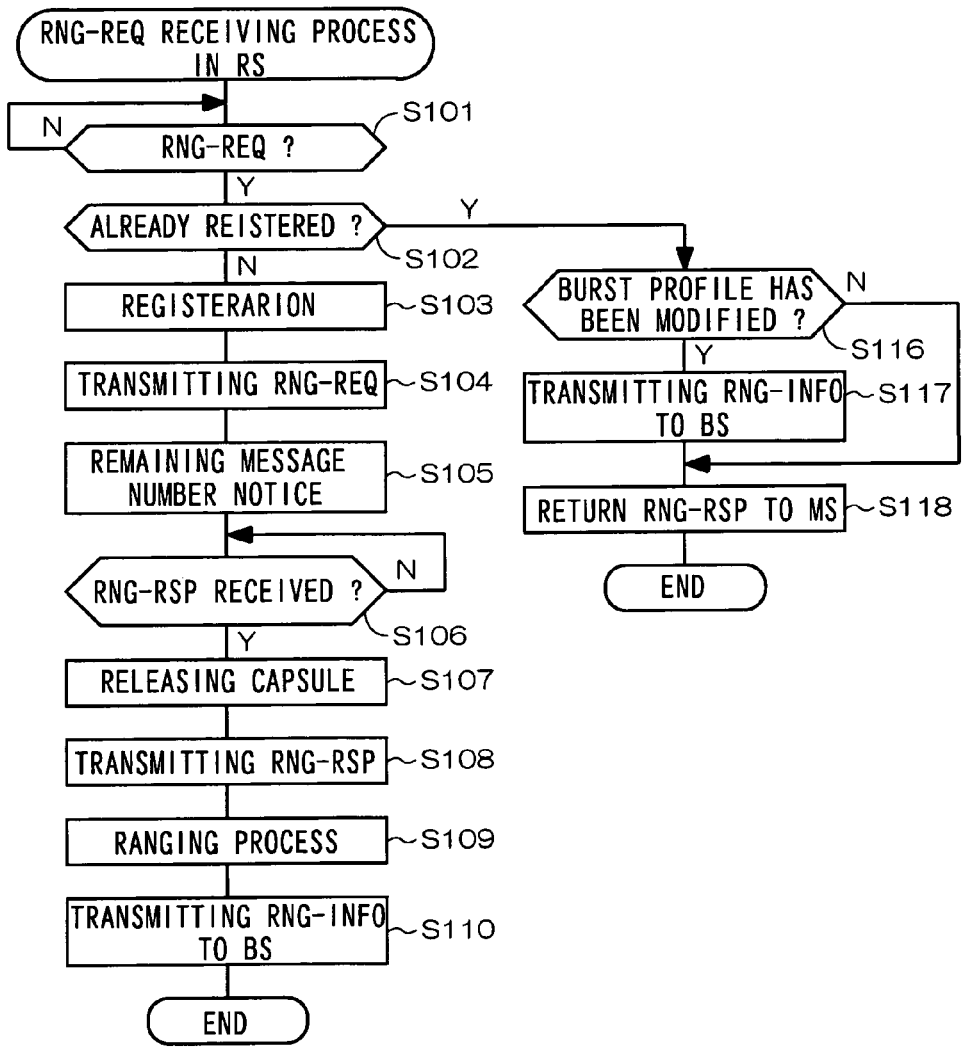
FIG. 4 shows examples of UL-MAP IEs (Information Elements) in a UL-MAP.
FIG. 5 is a flowchart showing a RNG-REQ receiving process in an RS.
Figure 16:
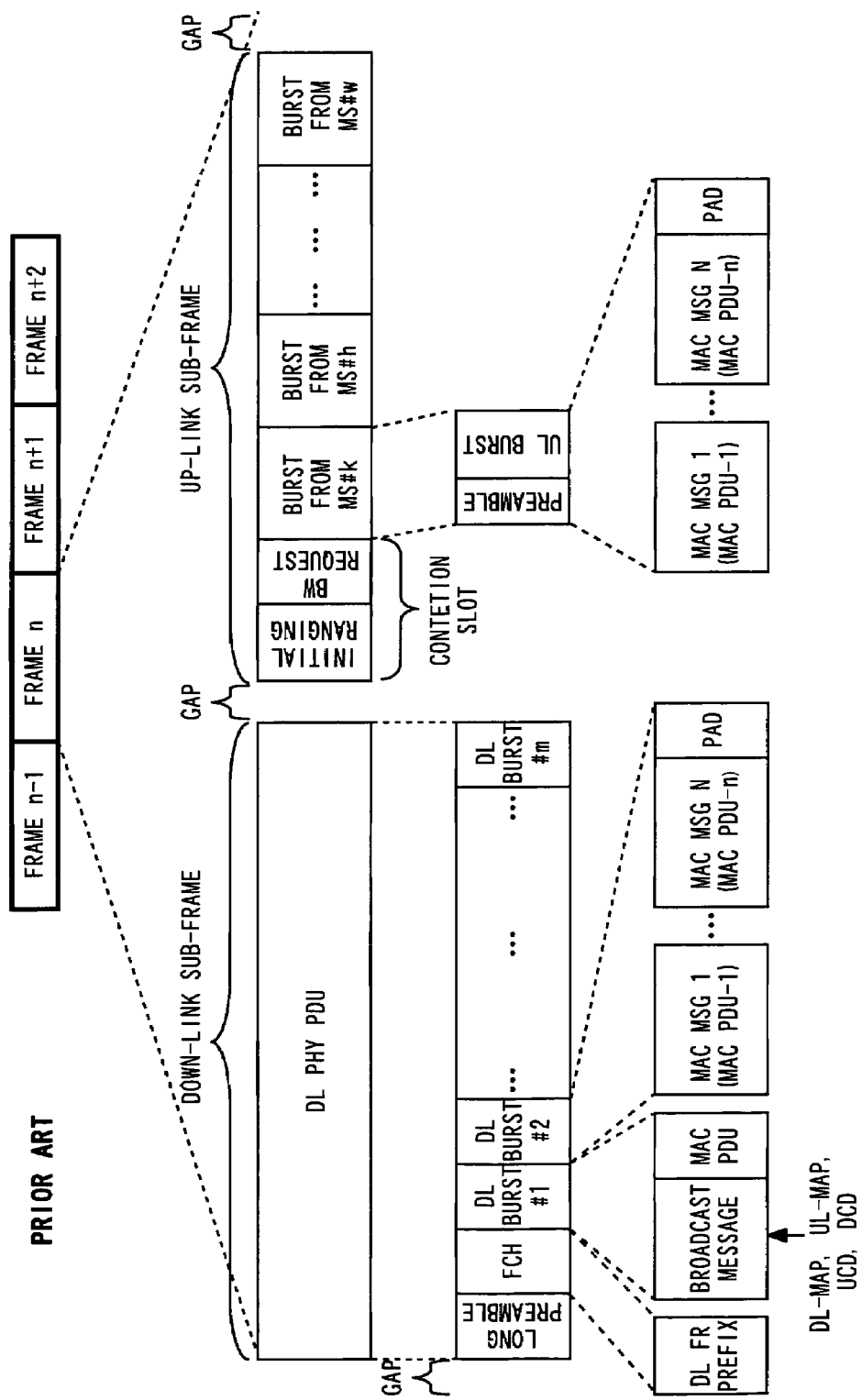
FIG. 16 shows an example of an OFDM frame configuration in P-MP.
Figure 18:
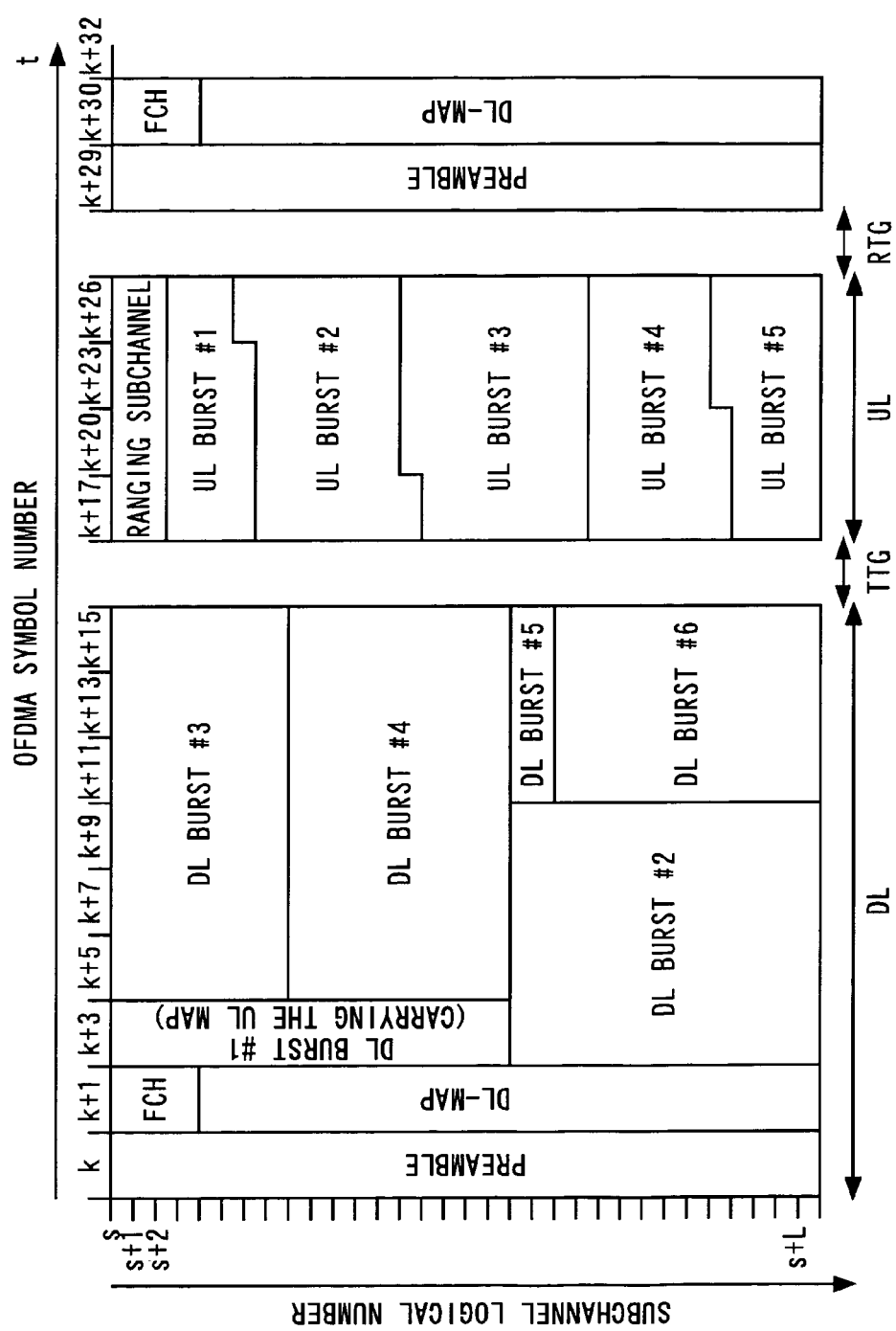
FIG. 18 shows an OFDMA frame structure prescribed in IEEE802.16.

FIG. 3 shows an OFDM frame configuration in the present embodiment. In comparison with the OFDM frame configuration (FIG. 16) prescribed in IEEE802.16, this is characterized in that, in an uplink subframe, initial ranging and BW (bandwidth) request periods for an RS are provided, and furthermore, a remaining message number notice period for which each RS notifies the BS of the number of remaining messages is provided. In a case of OFDMA, a ranging subchannel for notifying the messages is separately provided. These periods are not of a contention base but bandwidths dedicated to each RS provided in a UL-MAP. An example of UL-MAP IEs (Information Elements) within the UL-MAP in this case is shown in FIG. 4. In the example of FIG. 4, an initial ranging period is assigned to an RS1 for a 11110 symbol length from a time t1. The BS provides an initial ranging CID and a BW request CID for each RS.

MSs under either the BS or RS carry out RNG-REQ and BW-REQ in accordance with IEEE802.16 for a contention period assigned by the BS. The RS that has received the RNG-REQ and BW-REQ from the MSs encapsulates the messages in the initial ranging and BS request periods for the RS assigned by the BS and transmits (forwards) the same to the BS. Furthermore, it transmits the number of messages forwarded from all MSs thereunder to the BS in the remaining message number notice period. Here, since each period in which the RS transmits RNG-REQ, BW-REQ, and the message number is not of a contention base, it is possible to transmit and deliver the same without causing packet collisions.

Operations of the present embodiment will be described with reference to flowcharts of FIGS. 5 and 6 and a time chart of FIG. 7. In the present embodiment, since the MSs that can directly communicate with the BS via no RS operate in accordance with IEEE802.16, description thereof will be omitted.

FIG. 5 is a flowchart showing a RNG-REQ receiving process in an RS. The RS proceeds to step S102 upon receiving RNG-REQ that the MS3 has transmitted to carry out a ranging process with the RS in step S101. In step S102, whether or not an entry of the source (MS3) of the received RNG-REQ has been registered in its own control table is judged. If it has not been registered, a parameter such as receiving power is registered in the control table in a manner corresponding to an address of the MS3 in step S103. In step S104, the received RNG-REQ is encapsulated with a MAC header addressed to the BS and is transmitted in the initial ranging period for the RS. Moreover, the BW-REQ received from the MS3 is also encapsulated likewise and is transmitted in the BW request period for the RS.

In step S105, the number of messages that the RS has received from all MSs thereunder is totaled, and this is notified to the BS in the remaining message number notice-period as a remaining message number. The BS estimates the amount of data transmitted and received between the BS and RS based on the remaining message number notified by each RS. Furthermore, the BS dynamically determines communications slots to be assigned to the RS based on the results of estimation. Namely, more communications slots are assigned to an RS with a greater data amount. It is also possible to represent the amount of data transmitted and received between the BS and RS not by the remaining message number but by the aggregate number of MSs under the RS.

FIG. 8 schematically shows a condition where RNG-REQ transmitted from the MS3 is encapsulated by an RS and is forwarded to a BS. The RS encapsulates the RNG-REQ received from the MS3 with a MAC header whose source is the own station (RS) and whose encap bit has been set to "1" and transmits the same to the BS.

In the present embodiment, the MS3 that has transmitted the RNG-REQ judges which the RS or BS the receiver thereof is, and sets, if the receiver is the BS, Tref1 in a retransmission timer T1, and if the receiver is the RS, Tref2 longer than Tref1. Then, after transmitting the RNG-REQ, if the retransmission timer T1 has timed out before RNG-RSP being a response thereto is received, the MS3 retransmits the RNG-REQ.

Figure 6:
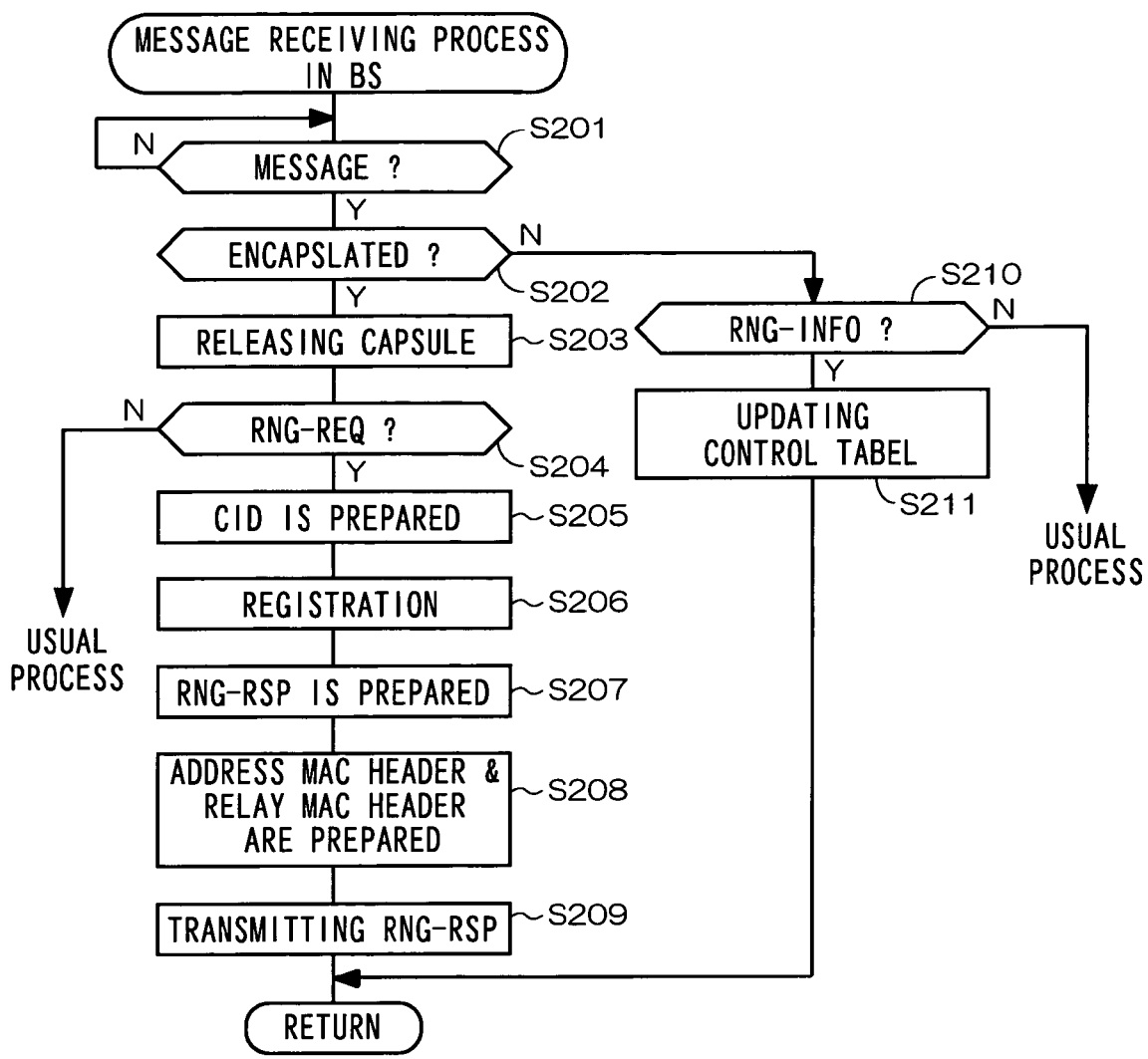
FIG. 6 is a flowchart showing a message receiving process in a BS.

FIG. 6 is a flowchart showing a message receiving process in a BS. After the BS has received the RNG-REQ relayed by the RS in step S201, it is judged in step S202 whether or not the RNG-REQ has been encapsulated with reference to the encap bit of the MAC header thereof. Here, since the encap bit has been set to "1" and is therefore judged that the RBG-REQ has been encapsulated. In step S203, the capsule is released. In step S204, whether or not the message that had been encapsulated is RNG-REQ is judged. Here, the BS proceeds to step S205 since it can be judged to be RNG-REQ.

In step S205, a CID of the MS3 is prepared, and in step S206, parameters such as a "MAC address," a "CID," and a "access point" are registered in a control table. In step S207, RNG-RSP being a response to the RNG-REQ is prepared. In step S208, an address MAC header corresponding to the MS3 and a relay MAC header corresponding to the RS are prepared. In step S209, the RNG-RSP with MAC header for destination has been encapsulated with the MAC header for relay and is transmitted to the RS.

FIG. 9 shows an example of a control table prepared for controlling each MS in a BS, in which a MAC address, a access point (@), and the like of each MS have been registered. For the MS3, an RS address has been registered as the access point (@).

Figures 10, 11:
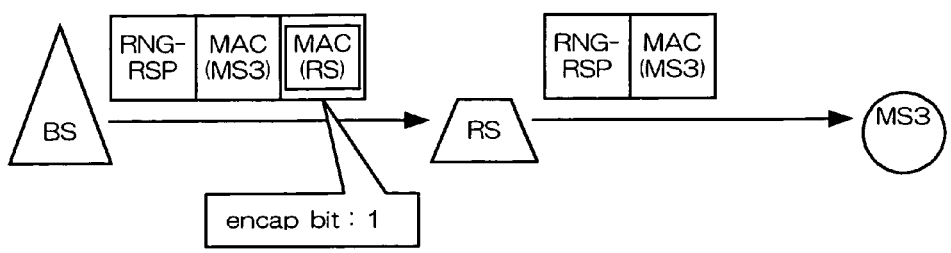
FIG. 10 schematically shows a condition where a RNG-RSP encapsulated and transmitted by a BS is decapusulated by an RS and is forwarded to an MS.
FIG. 11 shows a configuration of a RNG-INFO used in the present invention.

FIG. 10 schematically shows a condition where RNG-RSP encapsulated and transmitted from a BS is decapusulated in an RS and is forwarded to an MS3. From the BS, RNG-RSP for which a MAC header whose destination is the MS3 has been provided is encapsulated with a MAC header whose destination is the RS and whose encap bit has been set to "1" and is transmitted.

Returning to FIG. 5, the RS receives the encapsulated RNG-RSP in step S106, decapsulates the same in step S107, and transmits the RNG-REQ to the MS3 in step S108 after adding, thereto, TLV (Type/Length/Value) or the like for adjusting transmission power or the like measured when it has received the RNG-REQ from the MS3. In step S109, a ranging process is executed with respect to the MS3. In step S110, a ranging message (RNG-INFO) is transmitted to the BS.

As shown in FIG. 11, a downlink burst profile and an uplink burst profile adopted between the RS and MS are included in the RNG-INFO.

Returning to FIG. 6, when the RNG-INFO is received in step S210, the BS proceeds to step S211, and as an example shown in FIG. 12, an MS3 entry is added to the control table.

FIG. 13 shows contents of a control table prepared by the BS in the network configuration shown in FIG. 1, and with regard to the MS1 and MS2 located within the wireless area, its own address (BS) has been registered as the access point (@), whereas with regard to the MS3 and MS4 located out of the wireless area, an RS addresses (RS) has been registered as the access point (@).

In step S102 of FIG. 5, the RS proceeds to step S116 upon receiving RNG-REQ from an MS whose entry has already been registered in the control table, and whether or not the parameters such as burst profiles registered in the RNG-REQ have been modified is judged. If a modification is confirmed, it proceeds to step S117, and the modified burst profiles are registered in RNG-INFO and are transmitted to the BS. In step S118, the RNG-RSP is returned to the MS.

Figures 14, 15:
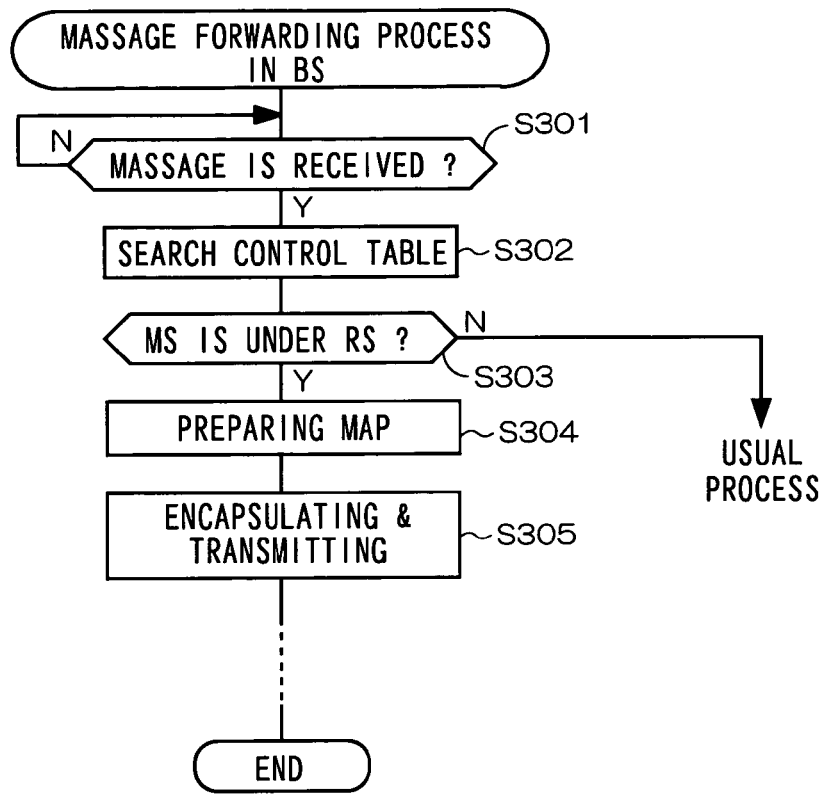
FIG. 14 is a flowchart showing steps of a BS that has received a message addressed to an MS forwarding the message to the MS.
FIG. 15 shows an example of a DL-MAP prepared in the present invention.

FIG. 14 is a flowchart showing steps of a BS that has received a message addressed to an MS forwarding the message to the MS. In the BS, when a message addressed to the MS is received in step S301, the control table is searched in step S302. In step S303, based on the search results, whether or not the MS is under the RS is judged. If the MS is not under the RS but can directly communicate with the BS, it shifts to a normal process. In contrast thereto, if the MS follows the RS, it proceeds to step S304.

In step S304, DL-MAP to be transmitted to the MS before data transmission is prepared. FIG. 15 is a view showing an example of a DL-MAP prepared in the present embodiment, and the BS prepares DL-MAP IEs in accordance with burst profiles between the BS and RS and between the RS and MS with reference to the control table. Namely, a time (t2–t1) of transmission to the RS is calculated by a modulation system or the like adopted between the BS and RS. On the other hand, a time (t4–t3) of transmission to the MS3 by the RS is calculated by a modulation system or the like adopted between the RS and MS3. The DL-MAP is encapsulated in step S305 and is transmitted.

Although the present invention has been described with respect to the preferred embodiment in the foregoing, the present invention is not necessarily limited to the above-described embodiment, and can be embodied by being variously modified without altering the concept of the present invention.

What is claimed is:

1. A method for P-MP wireless data communications for which a plurality of mobile stations are connected to one wireless base station, comprising:
    a relay station that relays communications between the wireless base station and each mobile station, and
    the relay station including steps of:
    receiving a communications opportunity request message from each mobile station; and
    forwarding each request message to the wireless base station in a transmission period assigned thereto,
    the wireless base station including steps of:
    receiving a request message from each mobile station;
    receiving a request message from each relay station; and
    returning a response message that notifies the requestor of a communications opportunity assigned thereto in response to each request message, wherein
    different transmission periods are assigned to the mobile station and relay station with regard to the request messages.

2. The method for wireless data communications according to claim 1, wherein
    the transmission period of a request message assigned to each mobile station is of a contention base, and the transmission period of a request message assigned to each relay station is not of a contention base.

3. The method for wireless data communications according to claim 1, wherein
    the communications opportunity assigned to each relay station is dynamically set based on a data amount transmitted and received by the relay station and wireless base station.

4. The method for wireless data communications according to claim 3, wherein
    the data amount transmitted and received by the relay station and wireless base station is represented by a number of messages transmitted from the relay station to the wireless base station.

5. The method for wireless data communications according to claim 3, wherein
    the data amount transmitted and received by the relay station and wireless base station is represented by a number of mobile stations under the relay station.

6. A system for P-MP wireless data communications for which a plurality of mobile stations are connected to one wireless base station, comprising:
    a relay station that relays communications between the wireless base station and each mobile station, and
    the relay station including means of:
    receiving a communications opportunity request message from each mobile station; and
    forwarding the request message to the wireless base station in a transmission period assigned thereto, and
    the wireless base station including means of: receiving a request message from each mobile station;
    receiving the request message from the relay station; and
    returning a response message that notifies the requester of a communications opportunity assigned thereto in response to the request message, wherein
    different transmission periods are assigned to the mobile station and relay station with regard to the request messages.

7. The system for wireless data communications according to claim 6, wherein
    the transmission period of the request message assigned to each mobile station is of a contention base, and the transmission period of the request message assigned to the relay station is not of a contention base.

8. The system for wireless data communications according to claim 6, wherein
    the communications opportunity assigned to the relay station is dynamically set based on a data amount transmitted and received by the relay station and wireless base station.

9. The system for wireless data communications according to claim 8, wherein
    the data amount transmitted and received by the relay station and wireless base station is represented by a number of messages transmitted from the relay station to the wireless base station.

10. The system for wireless data communications according to claim 8, wherein
the data amount transmitted and received by the relay station and wireless base station is represented by a number of mobile stations under the relay station.

11. A method for P-MP wireless data communications for which a plurality of mobile stations are connected to one wireless base station, comprising:
a relay station that relays communications between the wireless base station and each mobile station, and
the relay station including means of:
receiving a packet addressed to the wireless base station from the mobile station;
encapsulating the packet with a header whose source is the relay station; and
transmitting the encapsulated packet to the wireless base station,
the wireless base station including steps of:
receiving the encapsulated packet;
decapsulating the received packet;
generating a response packet to the received packet;
encapsulating the response packet with a header whose destination is the relay station; and
transmitting the encapsulated response packet, and
the relay station further including steps of:
receiving the encapsulated response packet from the wireless base station;
decapsulating the response packet; and
transmitting the response packet to the mobile station.

12. The method for wireless data communications according to claim 11, wherein the relay station further includes the step of notifying the wireless base station of burst profiles adopted between the relay station itself and mobile station.

13. The method for wireless data communications according to claim 11, wherein the mobile station includes the steps of:
judging which of the wireless base station or relay station a transmitted packet is received by; and
setting a retransmission timer of the packet longer when the packet is received by the relay station than when received by the wireless base station.

14. A system for P-MP wireless data communications for which a plurality of mobile stations are connected to one wireless base station, comprising:
a relay station that relays communications between the wireless base station and each mobile station, and
the relay station including means of:
receiving a packet addressed to the wireless base station from each mobile station;
encapsulating the packet with a header whose source is the relay station;
transmitting the encapsulated packet to the wireless mobile station;
receiving an encapsulated response packet from the wireless mobile station;
decapsulating the response packet; and
transmitting the response packet to each mobile station, and
the wireless base station including means of:
receiving the encapsulated packet;
decapsulating the received packet;
generating a response packet to the received packet;
encapsulating the response packet with a header whose destination is the relay station; and
transmitting the encapsulated response packet.

15. The system for wireless data communications according to claim 14, wherein the relay station further includes the unit of notifying the wireless base station of burst profiles adopted between the relay station itself and mobile station.

16. The system for wireless data communications according to claim 14, wherein the mobile station includes the units of:
judging which of the wireless base station or relay station a transmitted packet is received by; and
setting a retransmission timer of the packet longer when the packet is received by the relay station than when received by the wireless base station.

* * * * *